Patented Oct. 22, 1929

1,732,492

UNITED STATES PATENT OFFICE

VIGGO VALDEMAR JULIUS ANDRESEN, OF OSLO, NORWAY

SUGAR PRODUCT AND METHOD OF MAKING SAME

No Drawing. Application filed November 20, 1926, Serial No. 149,797, and in Norway June 4, 1926.

The commercial sugars, as well as the various sugar products, such as candy in all of its forms, are devoid of the mineral constituents of the raw product (cane sugar or beet sugar), or at least contain very little thereof.

These sugar products, then do not introduce into the animal organism, when taken as food, the mineral substances which are desirable if not absolutely essential for rational alimentation, as is the case when the sugar is eaten in the form of sweet fruit or sugar-containing plants or vegetable matter.

It might be thought that this disadvantage from the alimentation standpoint of commercial sugars or sugar products could readily be overcome by introducing into the sugar a lime compound, such, for instance, as calcium carbonate or calcium phosphate. The practical employment of such mixtures, however, meets with considerable objections, since the lime combinations, which could mainly enter here, are either insoluble in water or, at best, considerably less soluble than the sugar, so that on the sugar being dissolved there would be a precipitation of the lime, or an uneven distribution of the lime in the food, in which the sugar is used.

I effectually avoid these disadvantages by mixing with the sugar a colloidal lime compound, which is held evenly distributed in the sugar solution as long as required.

In manufacturing sugar products according to my invention, I use, for admixture with the sugar, a mixture of a lime salt which is insoluble or of low solubility in water (such as calcium saccharate, calcium carbonate or gypsum) together with an acid phosphate, so as to produce by the reaction of the several ingredients upon one another in the presence of water a colloid product, which assures an even and stable distribution of the lime in the sugar product.

*Examples*

1. 1.25 grams acid calcium phosphate are mixed with 2.25 grams calcium saccharate, which mixture then is added to 50 grams ordinary sugar.

2. 1 gram molecule acid calcium phosphate is mixed with 1 to 2 grams molecules chalk, and this mixture is then added to the sugar in an amount of 5 to 10%.

3. 1.25 grams acid calcium phosphate, 2.25 grams calcium saccharate, and 1.25 grams cream of tartar, are mixed and this mixture is pulverized and added to 50 grams of sugar.

4. 5 grams dicalcium phosphate, 2.5 grams acetic acid, and 2.5 grams water are mixed and added to 100 grams sugar.

5. 5 grams tricalcium phosphate, 3.5 grams acetic acid, and 2.5 grams water are mixed and added to 100 grams of sugar.

The solutions according to Formulæ 4 and 5 can be used as such as admixtures to syrup or other sugar products.

The mixture ratio of the several constituents, obviously, may be varied within wide limits, but a ratio of at least one molecule calcium saccharate or chalk to each molecule acid calcium phosphate will be found best for all practical purposes.

To the sugar may be added together with the lime salts, also other substances for modifying purposes, for instance, for taste improving purposes, organic acids, tartaric acid, malic acid, acetic acid, sodium chloride (common salt), etc. or, for the purpose of eliminating or counteracting unfavorable effects of the other admixtures, tartaric acid, cream of tartar, and other tartarates, would be indicated.

The stated salt mixture may be used in combination with any sugar product deficient in lime, such as ordinary commercial sugar, invert sugar, sugar of milk, grape sugar, syrup, etc., the ratio of the several ingredients being chosen as best suited in each case.

In place of the compounds mentioned, I may use a prepared natural equivalent, such as fish bone meal which when added to the sugar in the presence of water will have an equivalent effect, since it contains in itself the constituents necessary to form a colloidal product for preventing precipitation of its lime content.

What I claim is:—

1. The method of making sugar products rich in lime by introducing a lime compound into sugar, which consists in adding to the sugar a mixture of a lime salt of low solubility with an acid phosphate, for the purpose of producing by the reaction of the several ingredients upon one another in the presence of water a colloid product, having the property of effecting an even distribution of the lime in the sugar product.

2. The method of making sugar products rich in lime which consists in adding to the sugar product an acid phosphate, a lime salt, and a modifying agent.

3. The method of making sugar products rich in lime which consists in adding to the sugar product an acid calcium phosphate together with a lime salt.

4. The method of making sugar products rich in lime characterized by introducing into the sugar product fish bone meal.

5. The method of making sugar products rich in lime characterized by introducing into the sugar product a di- or tricalcium phosphate together with a weak acid.

6. A sugar product with which is incorporated an acid phosphate and a lime salt.

7. A sugar product with which is incorporated an acid phosphate, a lime salt, and a modifying agent.

8. A sugar product with which is incorporated a colloidal lime product.

9. A sugar product with which is incorporated a colloidal lime product and a modifying agent.

10. The method of making sugar products rich in lime characterized by introducing into the sugar product a colloidal lime compound.

In testimony whereof I affix my signature.

VIGGO VALDEMAR JULIUS ANDRESEN.

DISCLAIMER.

1,732,492.—*Viggo Valdemar Julius Andresen,* Oslo, Norway. SUGAR PRODUCT AND METHOD OF MAKING SAME. Patent dated October 22, 1929. Disclaimer filed March 1, 1934, by the assignee, *Maria C. Granger*.

Hereby enters this disclaimer to said three claims which are in the following words, to wit:

"3. The method of making sugar products rich in lime which consists in adding to the sugar product an acid calcium phosphate together with a lime salt."

"6. A sugar product with which is incorporated an acid phosphate and a lime salt."

"8. A sugar product with which is incorporated a colloidal lime product."

[*Official Gazette March 27, 1934.*]